Figure 4:
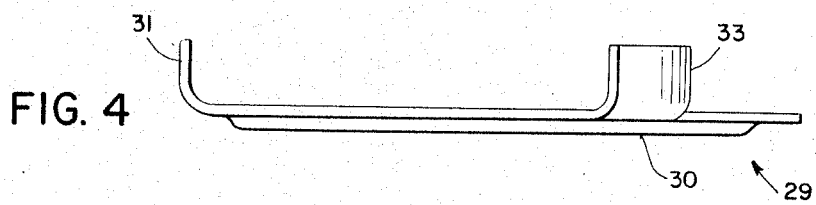

Jan. 16, 1968     R. R. BALAGUER     3,364,073
PRIMARY BATTERY
Original Filed April 3, 1964     4 Sheets-Sheet 1
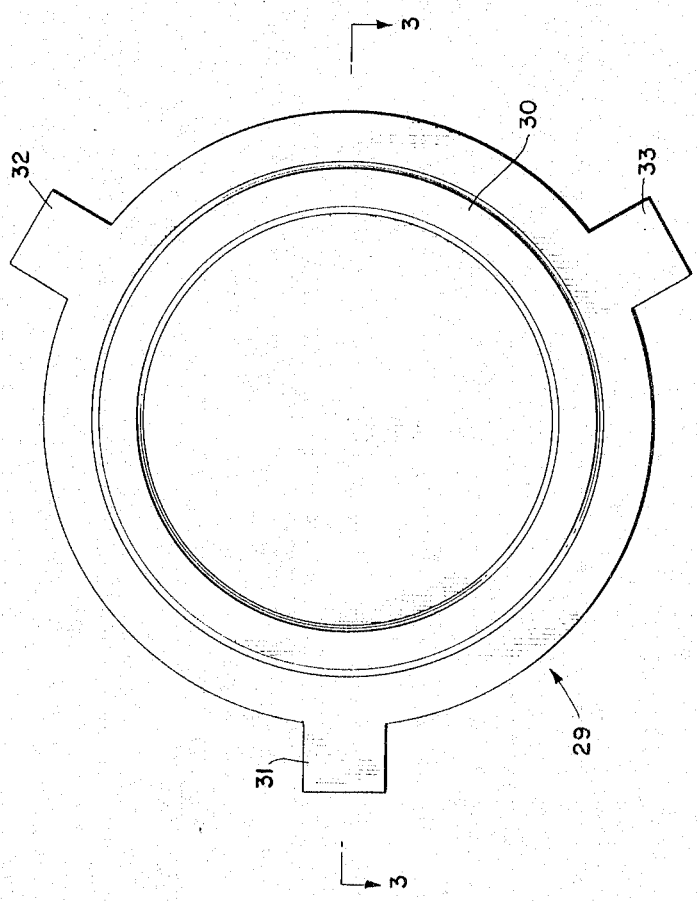
FIG. 2
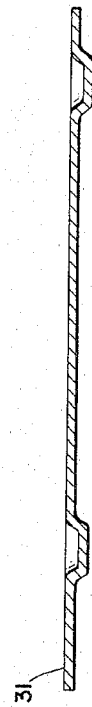
FIG. 3
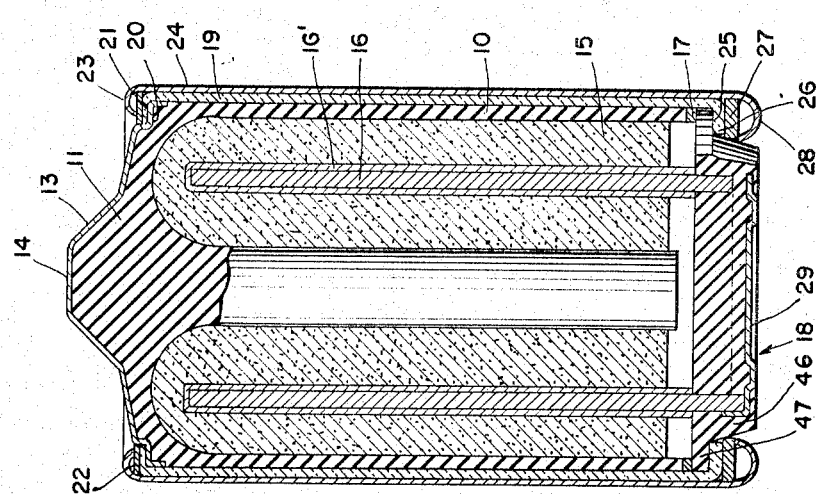
FIG. I Jan. 16, 1968   R. R. BALAGUER   3,364,073
PRIMARY BATTERY Original Filed April 3, 1964   4 Sheets-Sheet 2

Jan. 16, 1968  R. R. BALAGUER  3,364,073
PRIMARY BATTERY

Original Filed April 3, 1964  4 Sheets-Sheet 3

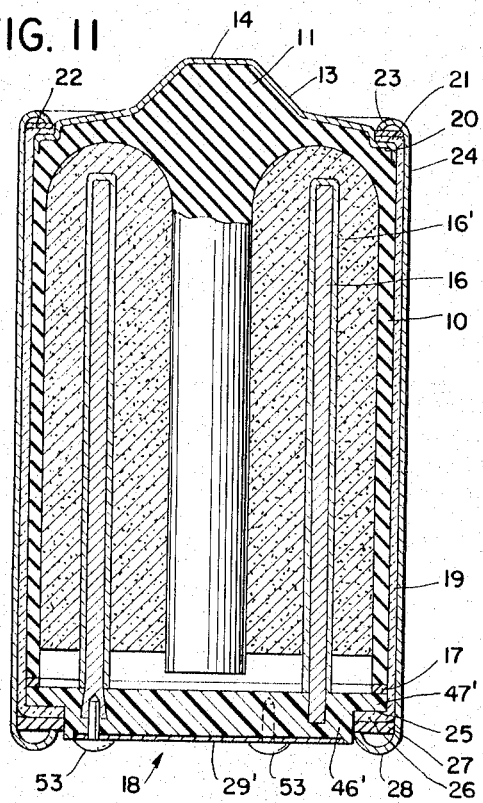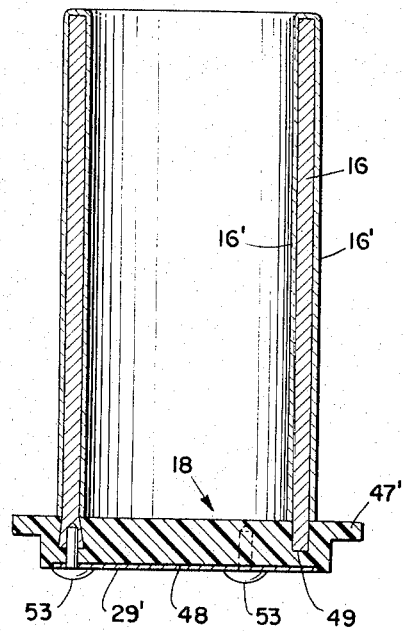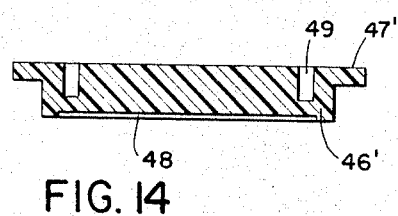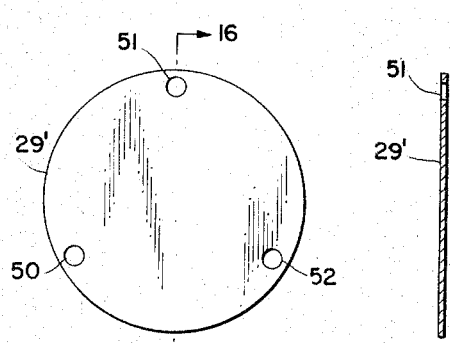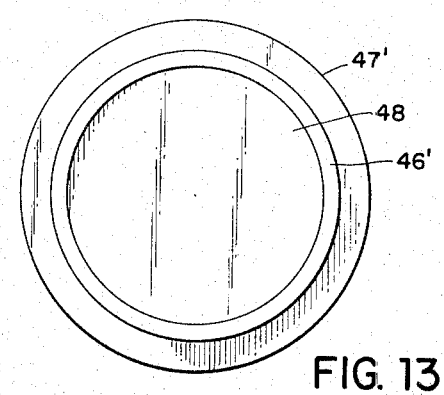

United States Patent Office 3,364,073
Patented Jan. 16, 1968

3,364,073
PRIMARY BATTERY
Rodolfo Rodriguez Balaguer, Harbor Beach, Fort Lauderdale, Fla., assignor, by mesne assignments, to Patent Holding Corporation, Fort Lauderdale, Fla., a corporation of Florida
Continuation of application Ser. No. 357,190, Apr. 3, 1964. This application Dec. 1, 1966, Ser. No. 598,515
5 Claims. (Cl. 136—107)

This is a continuation of application Ser. No. 357,190, filed Apr. 3, 1964, now abandoned.

The present invention relates to primary galvanic cells and more particularly to such cells of the so-called "dry" type.

The invention is principally concerned with primary batteries of the type shown in United States Patent 2,903,499, issued Sept. 8, 1959, to R. R. Balaguer, and hence will be described in connection with that type of battery. However, it should be understood that the principles of the invention are applicable to other types of batteries, e.g., batteries without a central carbon rod.

A major problem in the construction of dry cell batteries has been effecting adequate end seals which will avoid leakage of electrolyte or other corrosive liquids under varying service conditions. The problem has been especially acute with batteries of the type shown in the Balaguer patent where the metallic anode electrode is internal and must be electrically connected to an external contact element.

Leakage of corrosive liquids, even in minute quantities are highly undesirable for a number of reasons. One such reason is the possibility of damage to the device in which the battery is used. Another is the possibility of the leakage affording an electrical path between the cathode electrode and the external anode contact element which will result in premature discharge of the cell. Another reason, especially important in magnesium cells, is a drop in battery performance characteristic of a loss of moisture.

Leakage may occur from a number of reasons such as an unfortunate accumulation of manufacturing tolerances, differential expansions or contractions with major temperature changes, severe handling, excessive internal pressures, or metal corrosion.

In general, the seal ring closure of the anode contact element end of the battery tends to be the weak point with respect to the possibility of leakage. Accordingly, it has been the principal object of the invention to provide a novel and improved sealing closure for this end of the battery.

Another object of the invention has been the provision of such a sealing closure which minimizes or eliminates the danger of leakage due to differential expansions with temperature.

Another object of the invention has been the provision of such a sealing closure which avoids leakage due to corrosion of metal surfaces.

A further object of the invention has been the provision of such a sealing closure which minimizes or avoids leakage due to severe handling of the cell or excessive internal pressures.

Still another object of the invention has been the provision of such a sealing closure which avoids leakage due to manufacturing tolerances.

Another object of the invention has been the provision of a novel and improved dry cell battery in which the problem of electrolyte leakage is greatly minimized or largely eliminated.

Figure 5:
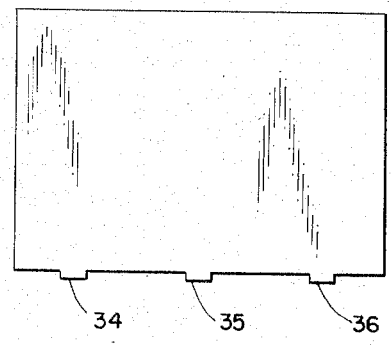
Figure 6:
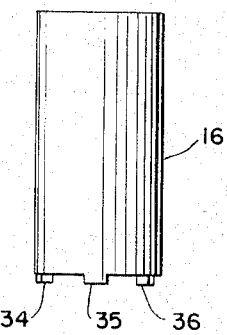
Figure 7:
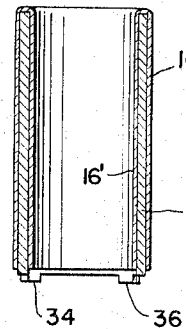
Figure 8:
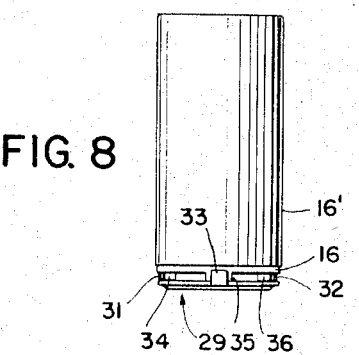
Figure 8A:
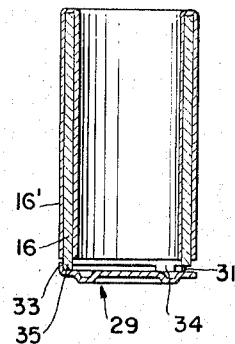
Figure 9:
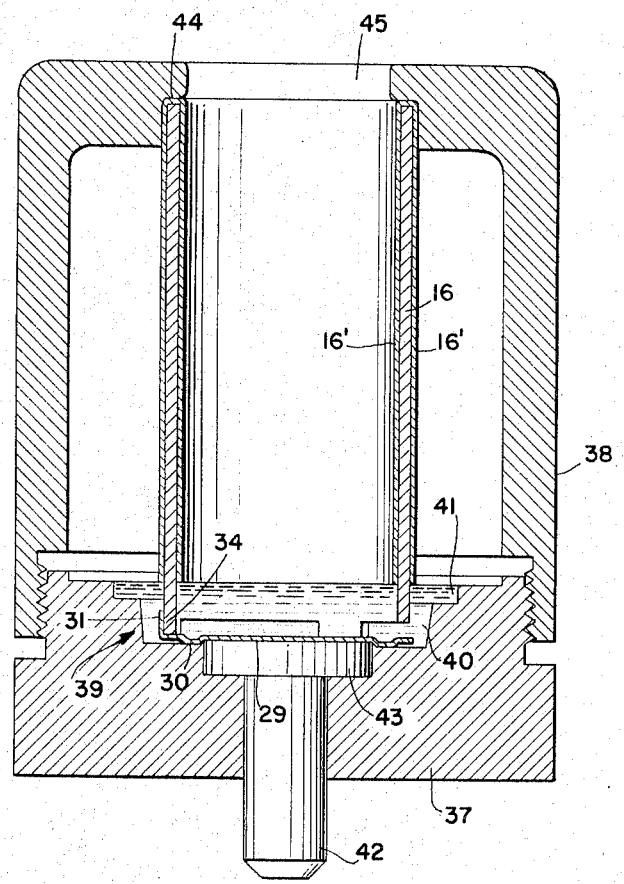
Figure 10:
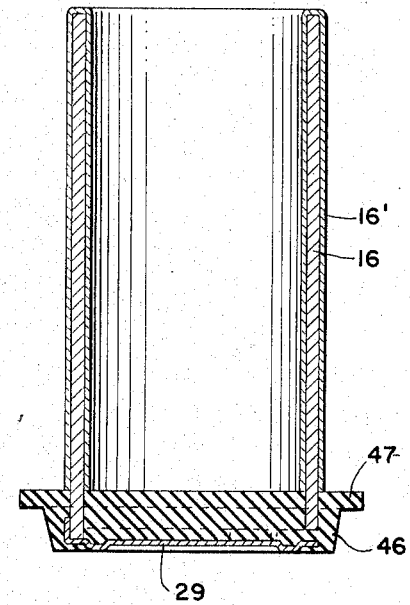

Other and further objects, features and advantages of the invention will appear more fully from the following description of the invention taken in connection with the appended drawings, in which:

FIG. 1 is a longitudinal sectional view of one form of dry cell battery construction embodying the invention;
FIG. 2 is a plan view of an anode contact element blank for the battery of FIG. 1;
FIG. 3 is a sectional view taken along the line 3—3 of FIG. 2;
FIG. 4 is a side elevational view of the formed anode contact element for the battery of FIG. 1;
FIG. 5 is an elevational view of an anode blank for the battery of FIG. 1;
FIG. 6 is an elevational view of the formed anode for the battery of FIG. 1;
FIG. 7 is a longitudinal sectional view of the anode of FIG. 6;
FIG. 8 is an elevational view showing the anode of FIG. 6 assembled to the anode contact element of FIG. 4;
FIG. 8A is a longitudinal sectional view of the assembly of FIG. 8 showing the bibulous paper wrapping on the anode;
FIG. 9 is a longitudinal sectional view of the assembled anode and contact element of FIG. 8 in a bottom forming mold;
FIGURE 10 is a longitudinal sectional view of the assembled anode, contact element and plastic bottom;
FIG. 11 is a longitudinal sectional view of another form of dry cell battery construction embodying the invention;
FIG. 12 is a top plan view of a plastic bottom element for the battery of FIG. 11;
FIG. 13 is a bottom plan view of the element of FIG. 12;
FIG. 14 is a sectional view taken along the line 14—14 of FIG. 13;
FIG. 15 is a bottom plan view of the anode contact element of the battery of FIG. 11;
FIG. 16 is a sectional view taken along the line 16—16 of FIG. 15; and
FIG. 17 is a longitudinal sectional view of the assembled anode, bottom element and anode contact element of the battery of FIG. 11.

Referring now to the drawings, and more particularly to FIG. 1, the dry cell battery illustrated in FIG. 1, is generally of the type shown in the aforementioned Balaguer patent. The battery has a cathode structure comprising a cylindrical carbon cup 10, a closed end or base 11, and a central carbon rod 12 projecting from base 11. The cup 10, base 11 and rod 12 are integral, but, if desired, the rod 12 may be made separately and may be inserted in a corresponding aperture in base 11. A metal cap 13 having a contact forming boss 14 is provided over base 11.

The cup 10, base 11 and rod 12 may be formed of a molded green carbon, as described in the aforementioned Balaguer patent. Preferably, the molding composition will be formed in accordance with the teachings of R. R. Balaguer United States patent application Ser. No. 208,096, now U.S. Patent Ser. No. 3,272,655, filed July 6, 1962.

The annular space between the cup 10 and the central rod 12 is filled with battery mix 15. The space within cup 10 beyond the free end of rod 12 is usually reserved as an air space into which may flow liquid exuded upon discharge of the cell. In some cells, especially magnesium cells, this space may be quite small or may be eliminated. A hollow cylindrical anode 16 is inserted into the battery mix with one end being adjacent but spaced from base 11 and the other end projecting beyond the free end of cup 10. A suitable bibulous covering or coating 16' is provided on both sides of anode 16 to prevent direct contact between the anode and the battery mix.

An annular sealing washer 17 is mounted on the free end of cup 10 and is held against the free end of cup 10 by a disk-shaped bottom closure element 18.

An electrically insulating jacket 19 surrounds cup 10 and has the upper end thereof crimped or folded over onto annular shoulder 20 of cap 13 as shown at 21. Shoulder 20 is shaped to fit a corresponding shoulder of cup 10. An annular electrically insulating washer 22 overlies the folded-over portion 21 and separates the same from a crimped end 23 of outer jacket 24.

The jacket 19 may be made of plastic or paper, but preferably is made of a series of closely spaced turns of fiberglass thread, as described in R. R. Balaguer United States patent application Ser. No. 260,270, now U. S. Patent Ser. No. 3,196,025, filed Feb. 21, 1963, or a fiberglass reinforced adhesive tape, as described in R. R. Balaguer United States patent application Ser. No. 312,049, now U.S. Patent Ser. No. 3,214,299, filed Sept. 27, 1963. The latter is preferable, especially for a magnesium cell. The washers 17 and 22 may conveniently be made of cardboard. The outer jacket 24 may be made of steel or from a plastic material, e.g., an extruded acrylic-butadiene-styrene plastic sold by Marbon Chemical Company of Washington, West Va., under the name Cycolac. The jacket 24 might conveniently be made of paper.

At the bottom end of the battery the jacket 19 is similarly folded or crimped over an annular shoulder 25 of closure element 18, as shown at 26. A cardboard or other suitable electrically insulating annular washer 27 contacts folded-over portion 26 of jacket 19 and is held thereagainst by crimped end 28 of outer jacket 24.

A metal contact element 29 is embedded in the end of bottom closure 18 and serves as one of the battery terminals. The other terminal is the boss 14.

The battery mix 15 may be of any type suited to the anode metal selected, e.g., zinc or magnesium. A typical battery mix composition for use with a magnesium anode is the following, percentages being by weight:

| | Percent |
|---|---|
| Type M manganese dioxide (synthetic) chemical ore | 88 |
| $Mg(OH)_2$ | 1 |
| $BaCrO_4$ | 3 |
| Acetylene black wet 550 ml./1000 g. with 250 g./l. $Mg \cdot Br_2 + 0.25$ g./l. $Na_2CrO_4$ | 8 |

Referring now to FIGS. 2 and 3, there is shown a blank from which the contact element 29 is made. Element 29 is formed as a disk and might typically be made from 0.012" thick tinned steel and have a diameter of 0.915". The foregoing and other dimensions set forth herein are given only by way of example and should not be taken as limiting the invention. The dimensions are for a typical "D" size cell and naturally would be altered greatly for other size cells, e.g., "AA" and #6. An annular downwardly extending groove 30 is provided in element 29. The groove 30 might have an inside diameter of 0.633" and an outside diameter of 0.787". Three tabs, 31, 32 and 33, spaced by 120° project outwardly from the periphery of element 29. As shown in FIG. 4, the tabs 31, 32 and 33 are bent upwardly along a short radius.

An anode blank is shown in FIG. 5 and the cylindrical anode 16 formed therefrom is shown in FIG. 6. In the case of magnesium or a magnesium alloy, the anode blank might be 0.050"–0.065" thick and the rolled anode cylinder 16 might have an outside diameter of 0.915". The blank might have a width of 2.765" and an overall height of 2", including three ⅟₁₆" high tabs projecting from the lower edge and spaced so as to be located 120° apart in the finished blank, as shown at 34, 35 and 36. The bibulous paper wrapping 16', shown in FIG. 7, surrounds the entire anode except for the tabs 34, 35 and 36 and a narrow strip, e.g., ⅟₃₂", just above the tabs. The wrapping might be a starch gel carrying gauze, as described in the aforementioned United States patent application Ser. No. 312,049, or a Methocel impregnated kraft paper. The Methocel, which might be used in a 5% aqueous solution, is a cellulose ether sold by Dow Chemical Company.

As shown in FIGS. 8 and 8A, the contact element 29 is positioned beneath anode cylinder 16, and tabs 31, 32 and 33 are permanently attached to tabs 34, 35 and 36, respectively, the attachment affording a good electrical and mechanical bond. The tabs 34–36 are preferably disposed inside the corresponding tabs 31–33. In the case of a magnesium anode, the corresponding tabs should be spot welded together, while in the case of a zinc anode, the tabs should be soldered together. The spacing between the disk 29 and the main body of the anode cylinder is equal to the height of the tabs 34, 35 and 36 and hence may be about ⅟₁₆".

The assembled anode and contact element of FIG. 8 are placed in a bottom-forming mold as shown in FIG. 9. The mold of FIG. 9 is in two parts, a lower part 37 and an upper part 38, adapted to be joined in threaded engagement as shown. The lower part 37 has a cavity 39 shaped to receive the lower portion of anode 16 and contact element 29. The cavity 39 has a lower portion 40 with a diameter slightly greater than the anode diameter and an upper portion 41 with a still larger diameter. The outer edge of portion 40 is tapered slightly, as shown.

The base of mold part 37 has a circular opening with an enlarged cylindrical recess which accommodate a piston 42 and head 43. The head 43 closely fits the portion of contact element 29 inside of groove 30. The head 43 is urged into tight contact with element 29 when the upper part 38 of the mold is screwed onto the lower part 37. For this purpose, upper part 38 has an annular shoulder 44 which engages the free end of anode 16 and forces the anode 16 and contact element 29 downwardly.

The outer edge of contact element 29 is above the base of cavity 39, since the base of groove 30 is the part which rests on the base of cavity 39.

The mold part 38 has a top opening 45 through which is inserted a measured quantity of a liquid plastic molding composition. The molding composition should be one which, when hardened, is electrically insulating and is resistant to the corrosive materials in and formed in the battery mix. One example of the suitable molding composition is the self-curing resin powder sold under the name Koldmount by Vernon-Benshoff Co. of Albany, N.Y.

The liquid molding composition fills the cavity 39 to the level shown, i.e., so as to cover the element 29 and the lower portion of anode 16 to the bottom of bibulous wrapping 16. The bibulous wrapping 16' may extend slightly into the molding composition to ensure that all portions of the anode 16 are covered either by plastic or by the bibulous wrapping. All portions of the contact element 29 are also covered by the plastic except that portion of the lower surface bounded by the groove 30 and the lower surface of the groove 30 itself.

When the plastic in the cavity 39 has hardened (or been hardened by heating or other appropriate technique) the upper mold part 38 is removed and the piston 42 is moved upwardly to eject the anode assembly.

The completed anode assembly is shown in FIG. 10. It will be seen that the plastic bottom of the anode assembly, designated 46, has a shape corresponding to cavity portion 40, while the flange portion 47 has a shape corresponding to cavity portion 41.

The portions 46 and 47 together form the bottom closure element 18 of FIG. 1. By reason of the construction illustrated, no portion of the anode or of the bottom contact element is exposed to the corrosive materials. Moreover, should there be any leakage of corrosive liquid past the open end of cathode cup 10, the spacing existing between the periphery of contact element 29 and the side of the cell makes it unlikely that the liquid will reach the contact element and hence form an electrical path between the anode and the cathode which will discharge the cell.

Referring now to FIG. 11, the battery construction illustrated is essentially the same as in FIG. 1 except for the bottom closure element 18. The formation and construction of the bottom closure element 18 of FIG. 11 will be described in connection with FIGS. 12–17. The anode 16 affixed to the bottom closure 18 of FIG. 11 may be identical to the one illustrated in FIG. 7 except that the tabs 34, 35 and 36 are omitted.

The bottom closure element of FIG. 11 is shown in detail in FIGS. 12–14 and is formed from a suitable plastic material, e.g., Plexiglas (methyl methacrylate). The bottom closure comprises a cylindrical body portion 46' and an annular flange 47' corresponding generally to the parts 46 and 47, respectively, of FIG. 1. A shallow circular recess 48 is provided in the bottom face of body 46', and a relatively deep annular recess 49 is provided in the top face of body 46'.

A thin tinned steel contact element 29' (FIGS. 15 and 16) fits in recess 48, as shown in FIG. 17. Also, as shown in FIG. 17, anode 16 fits in recess 49 with the end of bibulous wrapping 16' abutting tightly against the upper face of body portion 46'. The fit of anode 16 in recess 49 is preferably very tight.

Pilot holes 50, 51 and 52 are drilled in contact element 29', as shown in FIG. 15. The holes are preferably spaced 120° apart. The pilot holes also are drilled through body portion 46' and into the end of anode element 16. Escutcheon pins 53 are forced through the pilot holes to permanently mechanically and electrically connect the contact element 29' and the anode 16. Preferably, the diameter of the escutcheon pins is slightly greater than the diameter of the pilot holes, thereby forcing an expansion of the end of anode 16 around the escutcheon pins and a locking of the anode in recess 49, as show in FIG. 17. The expansion of the anode end against the resiliency of the Plexiglas material ensures also maintenance of a good electrical contact between the anode and the escutcheon pins and between the element 29' and the escutcheon pins. By way of example, the pilot holes might be 0.045" in diameter and the escutcheon pins might have a diameter of 0.050". Brass has been found to be a desirable material for the escutcheon pins.

While the invention has been described in connection with specific embodiments thereof and in specific uses, various modifications thereof will occur to those skilled in the art without departing from the spirit and scope of the invention as set forth in the appended claims.

What is claimed is:

1. A dry cell battery, comprising a carbon cup forming a cathode element and having a hollow body, a closed end and an open end; a metallic anode disposed within said body of said cup; battery mix disposed between said anode and said cathode; closure means for said open end of said cup, said closure means comprising an electrically insulating, corrosion resistant solid closure element having an area at least equal in size and shape to the size and shape of said open end of said hollow body and arranged to close said open end, an electrically conductive metallic contact plate mounted on an external surface of said closure element so as to be completely out of contact with battery mix in said hollow body and so as not to be exposed to the interior of said battery, and metallic means extending through the thickness of said closure element and into contact with said anode to provide electrical contact between said contact plate and said anode, said last mentioned means acting also to retain said contact plate on said external surface, said closure element being arranged to encompass said metallic means to prevent contact between said metallic means and said battery mix; and means to retain said closure member in closure relationship with said open end of said hollow body.

2. A dry cell battery, comprising a carbon cup forming a cathode element and having a hollow cylindrical body, a closed end and an open end; an annular metallic anode disposed within said body of said cup and being substantially concentric therewith; battery mix disposed between said anode and said cathode elements; a bibulous material carried on said anode and preventing direct contact between said anode and said mix; closure means for said open end of said cup, said closure means comprising an electrically insulating, corrosion resistant solid plastic disk having a diameter at least equal to the diameter of said open end of said hollow body and arranged to close said open end, an electrically conductive metallic plate mounted on an external surface of said plastic disk so as to be completely out of contact with battery mix in said hollow body and so as not to be exposed to the interior of said battery, and metallic means extending through the thickness of said plastic disk and into contact with said anode to provide electrical contact between said metallic plate and said anode, said last mentioned means acting also to retain said metallic plate on said external surface, said plastic disk encompassing said metallic means to prevent contact between said metallic means and said battery mix; and means to retain said plastic disk in closure relationship with said open end of said hollow body.

3. A dry cell battery as set forth in claim 2 in which said plastic disk is molded about the end of said anode.

4. A dry cell battery as set forth in claim 2 in which said metallic means comprises a plurality of upwardly extending tabs projecting from said metallic plate and permanently electrically and mechanically connected to said anode.

5. A dry cell battery, comprising a carbon cup forming a first cathode element and having a hollow cylindrical body, a closed end and an open end; a carbon rod projecting from said closed end of said cup and disposed generally along the longitudinal axis of said cup and being electrically connected thereto, said carbon rod forming a second cathode element; an annular metallic anode disposed between said rod and said body of said cup and being substantially concentric therewith; battery mix disposed between said anode and said cathode elements; a bibulous material carried on said anode and preventing direct contact between said anode and said mix; an outer jacket member surrounding said hollow body; closure means for said open end of said cup, said closure means comprising an electrically insulating, corrosion resistant solid plastic disk having a diameter at least equal to the diameter of said open end of said hollow body and arranged to close said open end, an electrically conductive metallic disk mounted on an external surface of said plastic disk so as to be completely out of contact with battery mix in said hollow body and so as not to be exposed to the interior of said battery, and metallic means extending through the thickness of said plastic disk and into contact with said anode to provide electrical contact between said metallic disk and said anode, said last mentioned means acting also to retain said metallic disk on said external surface, said solid plastic disk being arranged to encompass said metallic means to prevent contact between said battery mix and said metallic means; and means including an end of said outer jacket member to retain said plastic disk in closure relationship with said open end of said hollow body.

References Cited
UNITED STATES PATENTS

| | | | |
|---|---|---|---|
| 2,823,246 | 2/1958 | Lang | 136—121 |
| 3,214,299 | 10/1965 | Balaguer | 136—107 |
| 3,245,837 | 4/1966 | Ikeda et al. | 136—123 |

WINSTON A. DOUGLAS, *Primary Examiner.*

A. SKAPARS, *Assistant Examiner.*